(12) United States Patent
Akutsu

(10) Patent No.: US 11,533,015 B2
(45) Date of Patent: Dec. 20, 2022

(54) DRIVE DEVICE-INTEGRATED ROTARY ELECTRIC MACHINE AND ELECTRIC POWER STEERING DEVICE USING SAME

(71) Applicant: Mitsubishi Electric Corporation, Tokyo (JP)

(72) Inventor: Satoru Akutsu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 445 days.

(21) Appl. No.: 16/496,722

(22) PCT Filed: Jun. 5, 2017

(86) PCT No.: PCT/JP2017/020798
§ 371 (c)(1),
(2) Date: Sep. 23, 2019

(87) PCT Pub. No.: WO2018/225123
PCT Pub. Date: Dec. 13, 2018

(65) Prior Publication Data
US 2021/0111659 A1 Apr. 15, 2021

(51) Int. Cl.
*H02P 27/08* (2006.01)
*H02P 29/028* (2016.01)
(Continued)

(52) U.S. Cl.
CPC .......... *H02P 29/028* (2013.01); *B62D 5/0421* (2013.01); *H02P 25/22* (2013.01);
(Continued)

(58) Field of Classification Search
CPC ........ H02P 29/028; H02P 25/22; H02P 27/08; B62D 5/0421; B62D 3/12
See application file for complete search history.

(56) References Cited

U.S. PATENT DOCUMENTS 7,956,563 B2 * 6/2011 Perisic .................... B60L 58/40
318/400.41
8,681,457 B2 * 3/2014 Minegishi .............. B60K 6/365
318/434
(Continued)

FOREIGN PATENT DOCUMENTS

DE 102014206518 A1 10/2014
JP 2014017987 A 1/2014
JP 2016-032977 A 3/2016

OTHER PUBLICATIONS

Communication dated Mar. 30, 2020, from the European Patent Office in application No. 17912922.6.
(Continued)

*Primary Examiner* — Rina I Duda
(74) *Attorney, Agent, or Firm* — Sughrue Mion, PLLC; Richard C. Turner

(57) ABSTRACT

The invention includes a first power supply connector, which connects a first inverter unit that supplies a drive current to a first three-phase winding of a rotary electric machine to a first vehicle power supply, and a second power supply connector, which connects a first second inverter unit that supplies a drive current to a second three-phase winding of the rotary electric machine to a second vehicle power supply, wherein a voltage of the first vehicle power supply is higher than a voltage of the second vehicle power supply, and a current capacity of the first power supply connector is smaller than a current capacity of the second power supply connector.

6 Claims, 5 Drawing Sheets

(51) Int. Cl.
  *B62D 5/04* (2006.01)
  *H02P 25/22* (2006.01)
  *B62D 3/12* (2006.01)
(52) U.S. Cl.
  CPC ............... *H02P 27/08* (2013.01); *B62D 3/12* (2013.01); *B62D 5/0424* (2013.01)

(56) References Cited

U.S. PATENT DOCUMENTS

| | | | | |
|---|---|---|---|---|
| 8,928,264 | B2 * | 1/2015 | Taniguchi | H02P 25/188 318/400.26 |
| 8,981,691 | B2 * | 3/2015 | Arai | H02P 29/0241 363/56.02 |
| 2013/0257328 | A1 * | 10/2013 | Arai | H02P 29/032 318/400.22 |
| 2013/0264981 | A1 | 10/2013 | Taniguchi | |
| 2014/0097776 | A1 | 4/2014 | Hayashi | |
| 2015/0298727 | A1 * | 10/2015 | Kimpara | B62D 5/0484 701/43 |
| 2016/0036371 | A1 * | 2/2016 | Yamasaki | B62D 5/046 318/400.22 |

OTHER PUBLICATIONS

Communication dated Nov. 30, 2020, from the State Intellectual Property Office of the P.R.C in application No. 201780091119.6.
Communication dated Jun. 15, 2020, issued by the Intellectual Property Office of India in application No. 201927034772.
International Search Report for PCT/JP2017/020798 dated Sep. 5, 2017 {PCT/ISA/210].

* cited by examiner

DRIVE DEVICE-INTEGRATED ROTARY ELECTRIC MACHINE AND ELECTRIC POWER STEERING DEVICE USING SAME

CROSS REFERENCE TO RELATED APPLICATIONS

This application is a National Stage of International Application No. PCT/JP2017/020798 filed Jun. 5, 2017.

TECHNICAL FIELD

The present invention relates to a drive device-integrated rotary electric machine used as, for example, a vehicle-use rotary electric machine, and to an electric power steering device in which the drive device-integrated rotary electric machine is used.

Background Art

A double inverter type drive device-integrated rotary electric machine that has two sets of each of a power supply connector, an inverter, and a three-phase winding in order to enable restriction of a fluctuation in a power supply to another vehicle-mounted device while creating sufficient redundancy in a supply of power to an electric power steering device, and in which two sets of power supply connectors of the same current capacity are provided, has been disclosed to date in, for example, JP-A-2016-32977 (Patent Document 1) as this kind of drive device-integrated rotary electric machine.

CITATION LIST

Patent Literature

Patent Document 1: JP-A-2016-32977 (FIG. 2)

SUMMARY OF INVENTION

Technical Problem

The drive device-integrated rotary electric machine disclosed in Patent Document 1 is such that when there is an abnormality in one power supply line, a supply of power to a controller can be continued using another power supply line, because of which there is an advantage in that sufficient redundancy can be created in a supply of power to the electric power steering device. However, there is a problem with the drive device-integrated rotary electric machine in that the size of the device increases in order to secure space in which to install the two sets of power supply connectors, and space for inserting and removing the connectors.

The invention, having been contrived in order to resolve such a problem, has an object of obtaining a drive device-integrated rotary electric machine, and an electric power steering device in which the drive device-integrated rotary electric machine is used, such that two sets of power supply connectors can be provided without increasing the size of the device.

Solution to Problem

A drive device-integrated rotary electric machine according to the invention is a drive device-integrated rotary electric machine including a rotary electric machine having a first three-phase winding and a second three-phase winding, a first inverter unit that supplies a drive current to the first three-phase winding, a second inverter unit that supplies a drive current to the second three-phase winding, a first power supply connector that connects the first inverter unit to a first vehicle power supply, and a second power supply connector that connects the second inverter unit to a second vehicle power supply, wherein a voltage of the first vehicle power supply is higher than a voltage of the second vehicle power supply, and a current capacity of the first power supply connector is smaller than a current capacity of the second power supply connector.

Advantageous Effects of Invention

According to the invention, two sets of power supply connectors can be provided without increasing the size of a device, because of which a drive device-integrated rotary electric machine with good ease of mounting and assembly workability can be obtained.

Objects, characteristics, aspects, and advantages of the invention other than those heretofore described will become more apparent from the following detailed description of the invention, which refers to the drawings.

DESCRIPTION OF EMBODIMENTS

Hereafter, preferred embodiments of a drive device-integrated rotary electric machine according to the invention, and an electric power steering device in which the drive device-integrated rotary electric machine is used, will be described in detail, with reference to the drawings.

First Embodiment

Figure 1:
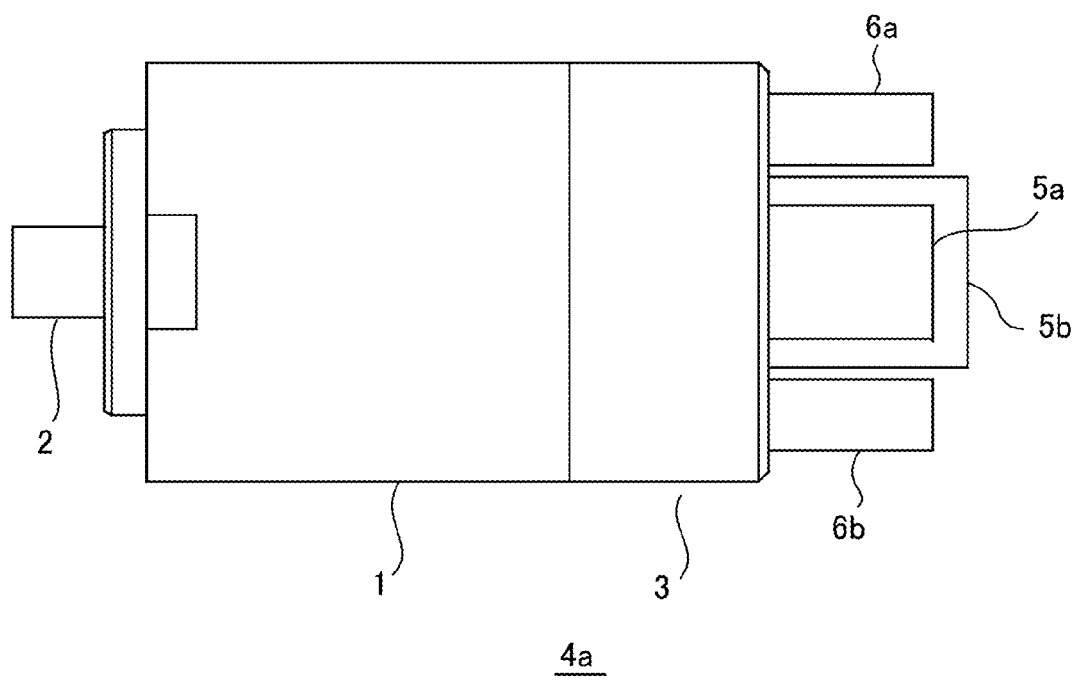
FIG. 1 is a side view of a drive device-integrated rotary electric machine according to a first embodiment of the invention.
Figure 2:
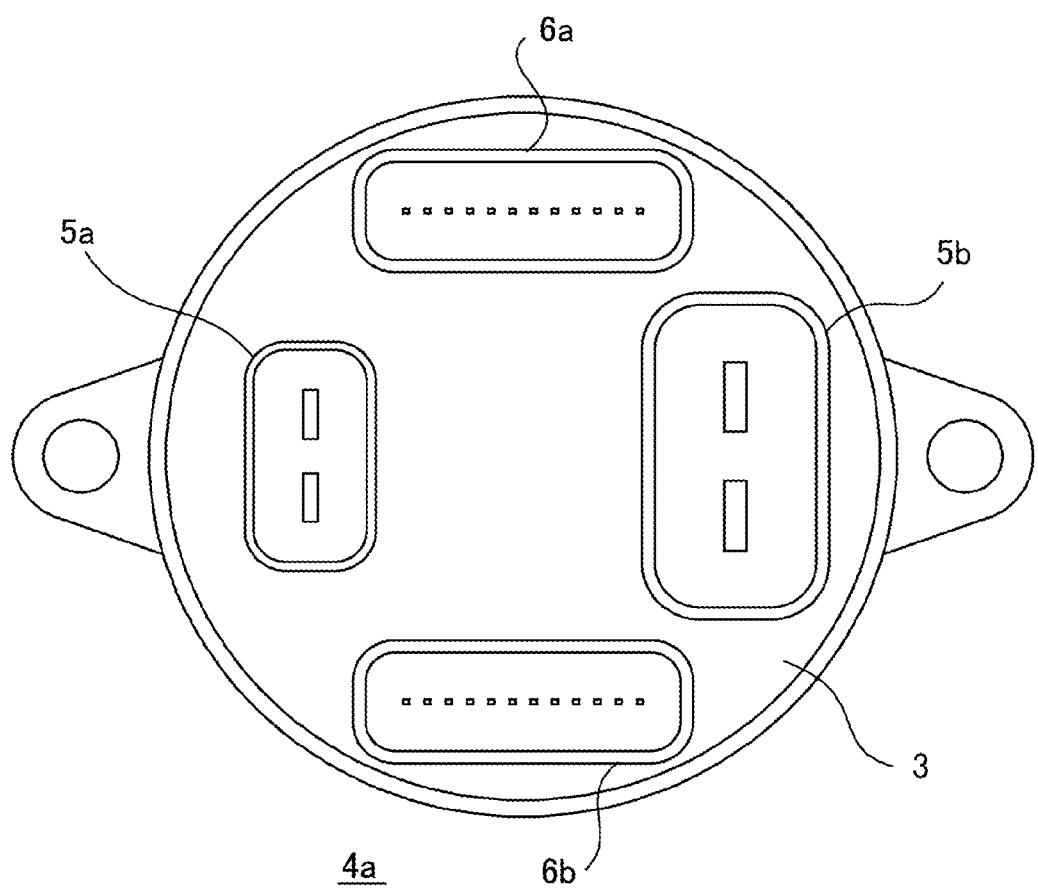
FIG. 2 is an end view of a non-output shaft side of the drive device-integrated rotary electric machine according to the first embodiment of the invention.
Figure 3:
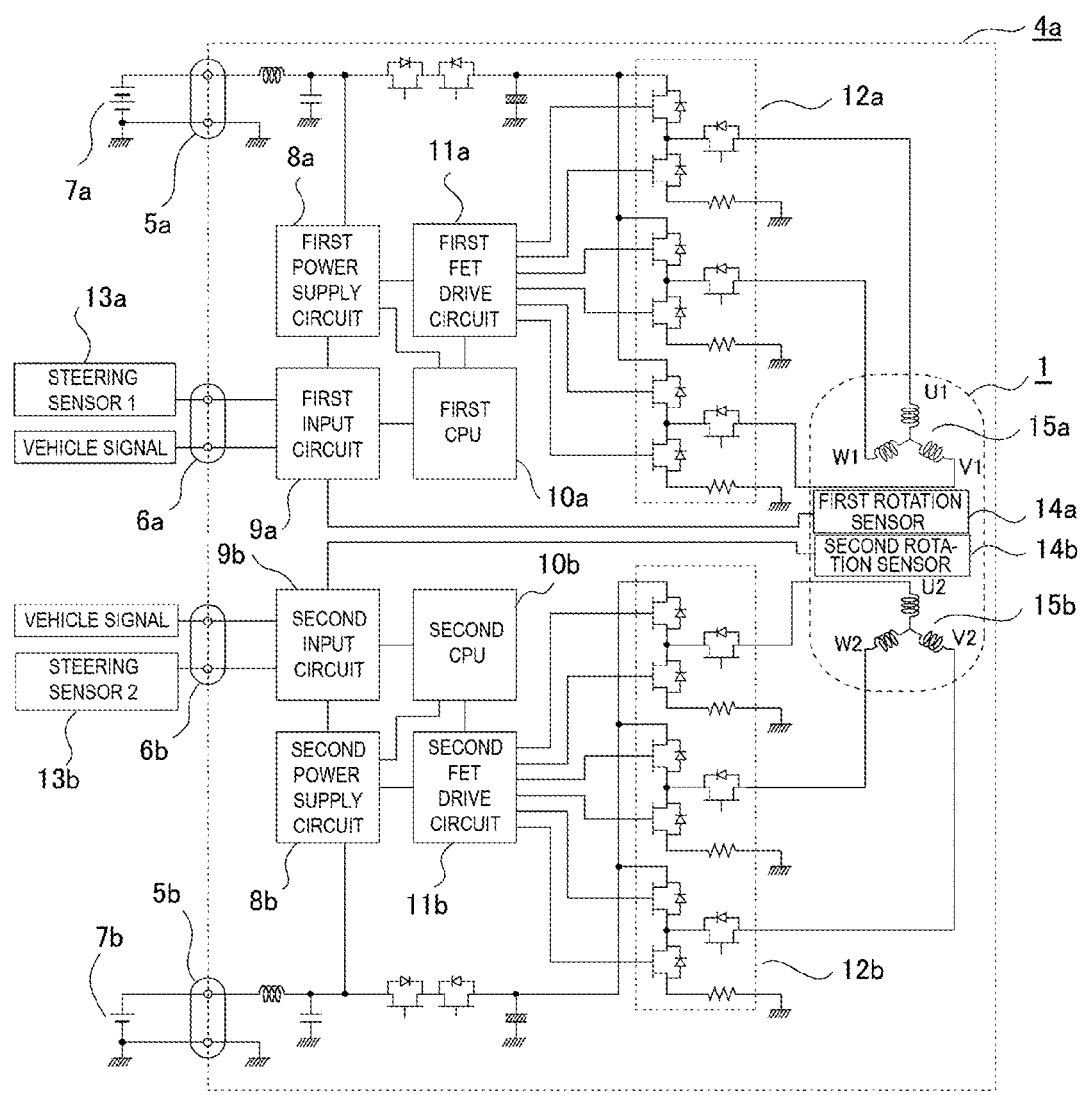
FIG. 3 is a circuit block diagram of the drive device-integrated rotary electric machine according to the first embodiment of the invention.

FIG. 1 is a side view of a drive device-integrated rotary electric machine according to a first embodiment of the invention, FIG. 2 shows an end view of a non-output shaft side of the drive device-integrated rotary electric machine, and FIG. 3 is a circuit block diagram of the drive device-integrated rotary electric machine.

In FIG. 1 to FIG. 3, a rotary electric machine 1 is a permanent magnet synchronized motor, wherein two sets of three-phase windings are wound around an unshown stator, forming a three-phase duplex motor. A coupling mechanism 2, such as a coupling or a pulley, to be coupled to a vehicle steering mechanism is attached to an output shaft side end portion of the rotary electric machine 1. Also, a drive device 3 is coaxially and integrally attached to an end portion of the rotary electric machine 1 on a side opposite to that of the coupling mechanism 2, configuring a drive device-integrated rotary electric machine 4a.

A first power supply connector 5a, a second power supply connector 5b, a first signal connector 6a, and a second signal connector 6b are provided on an end portion of the drive device 3. The first power supply connector 5a is connected to a first vehicle power supply 7a, as shown in FIG. 3, and the second power supply connector 5b is connected to a second vehicle power supply 7b whose power supply voltage is lower than that of the first vehicle power supply 7a.

The drive device 3 has two sets formed of a first power supply circuit 8a, a second power supply circuit 8b, a first input circuit 9a, a second input circuit 9b, a first CPU 10a, a second CPU 10b, a first FET drive circuit 11a, a second FET drive circuit 11b, a first inverter unit 12a configured of power elements such as power MOSFETs, wherein three phases' worth configure one set, and a second inverter unit 12b configured in the same way as the first inverter unit 12a. The first power supply circuit 8a, the second power supply circuit 8b, the first input circuit 9a, the second input circuit 9b, the first CPU 10a, the second CPU 10b, the first FET drive circuit 11a, and the second FET drive circuit 11b configure a control circuit of the drive device 3.

A signal from a first steering sensor 13a configuring a steering mechanism, and a vehicle signal such as vehicle speed, are input via the first signal connector 6a into the first input circuit 9a, and furthermore, a signal from a first rotation sensor 14a, which detects an angle of rotation of an unshown rotor of the rotary electric machine 1 using wiring in a device interior, is input. In the same way, a signal from a second steering sensor 13b configuring a steering mechanism, and a vehicle signal such as vehicle speed, are input via the second signal connector 6b into the second input circuit 9b, and furthermore, a signal from a second rotation sensor 14b, which detects the angle of rotation of the unshown rotor of the rotary electric machine 1 using wiring in the device interior, is input. The first inverter unit 12a and the second inverter unit 12b are connected to the first vehicle power supply 7a and the second vehicle power supply 7b respectively via the first power supply connector 5a and the second power supply connector 5b. Three-phase outputs of the first inverter unit 12a and the second inverter unit 12b are connected by wiring in the device interior to a first three-phase winding 15a and a second three-phase winding 15b respectively of the rotary electric machine 1, thereby supplying a drive current.

A current capacity of the first power supply connector 5a is smaller than a current capacity of the second power supply connector 5b. A current capacity being small means that a size of a connector terminal (mainly a terminal width) is small, that is, a current capacity being small means that an actual size of a power supply connector is small. Because of this, it is sufficient that a space in which the power supply connector is installed is small, whereby an increase in size of a device is prevented. It not being sufficient that a connector with the external dimensions thereof can be physically disposed, it is necessary to secure a space in which to insert and remove the connector in a state mounted in a vehicle, so when reducing the size of the connector, an advantage more than equivalent to an amount by which the size of the connector itself is reduced is obtained in reducing the size of the device. Herein, a connector current capacity is a value of an allowed current with which a connector can be energized, and is set to be a value such that, for example, a value of a temperature rise of the connector when energizing continuously with a constant current comes within an allowed range, with consideration to a connector terminal material, a connector housing material, a usage environment, and the like.

The current capacities of the two sets of power supply connectors, those being the first power supply connector 5a and the second power supply connector 5b, are set so that products of a power supply voltage and the current capacities of the two sets are practically equal values. For example, when the power supply voltage of the first vehicle power supply 7a on a high voltage side is four times the power supply voltage of the second vehicle power supply 7b on a low voltage side, the current capacity of the first power supply connector 5a connected to the first vehicle power supply 7a is one-fourth of the current capacity of the second power supply connector 5b connected to the second vehicle power supply 7b. This is because outputs of the rotary electric machine 1 generated by the two sets of three-phase windings, that is, the first three-phase winding 15a and the second three-phase winding 15b, are designed so as to be equal, and means that powers, that is, products of voltage and current, that need to be supplied to the two sets of drive circuits, that is, the first FET drive circuit 11a and the second FET drive circuit 11b, are equal. Therefore, the current capacity of the first power supply connector 5a on the high voltage side can be reduced by an amount by which the voltage increases.

As a method of arranging so that the outputs of the rotary electric machine 1 generated by the two sets of three-phase windings, those being the first three-phase winding 15a and the second three-phase winding 15b, are equal, a modulation rate of the first inverter unit 12a on the high voltage side is reduced with respect to a modulation rate of the second inverter unit 12b on the low voltage side by a power supply voltage ratio (the power supply voltage of the second vehicle power supply 7b/the power supply voltage of the first vehicle power supply 7a), an induced voltage constant of the first three-phase winding 15a on the high voltage side is increased with respect to an induced voltage constant of the second three-phase winding 15b on the low voltage side by a power supply voltage ratio (the power supply voltage of the first vehicle power supply 7a /the power supply voltage of the second vehicle power supply 7b), or the like.

A reason two sets of power supply voltages with differing vehicle power supplies are prepared is, in addition to securing redundancy by duplicating the power supplies, to cause the configurations of the two power supplies to differ, thereby avoiding failures occurring simultaneously due to the same cause. In recent years, vehicles in which a high voltage battery is mounted, such as an electric vehicle, a plug-in hybrid vehicle, and a hybrid vehicle, have been increasing, and preparing a 12V power supply from an existing lead battery, and a power supply stepped down from the high voltage batteries, a 48V power supply for example, can be carried out comparatively easily.

As heretofore described, the drive device-integrated rotary electric machine 4a includes connectors, power supply circuits, input circuits, CPUs, FET drive circuits, inverter units, three-phase windings, and rotation sensors, and forms a complete dual system wherein all components controlling a drive of the rotary electric machine 1 are configured in duplicate, meaning that even when one system fails, the other system can continue to drive unaffected, whereby reliability increases considerably.

Figure 4:
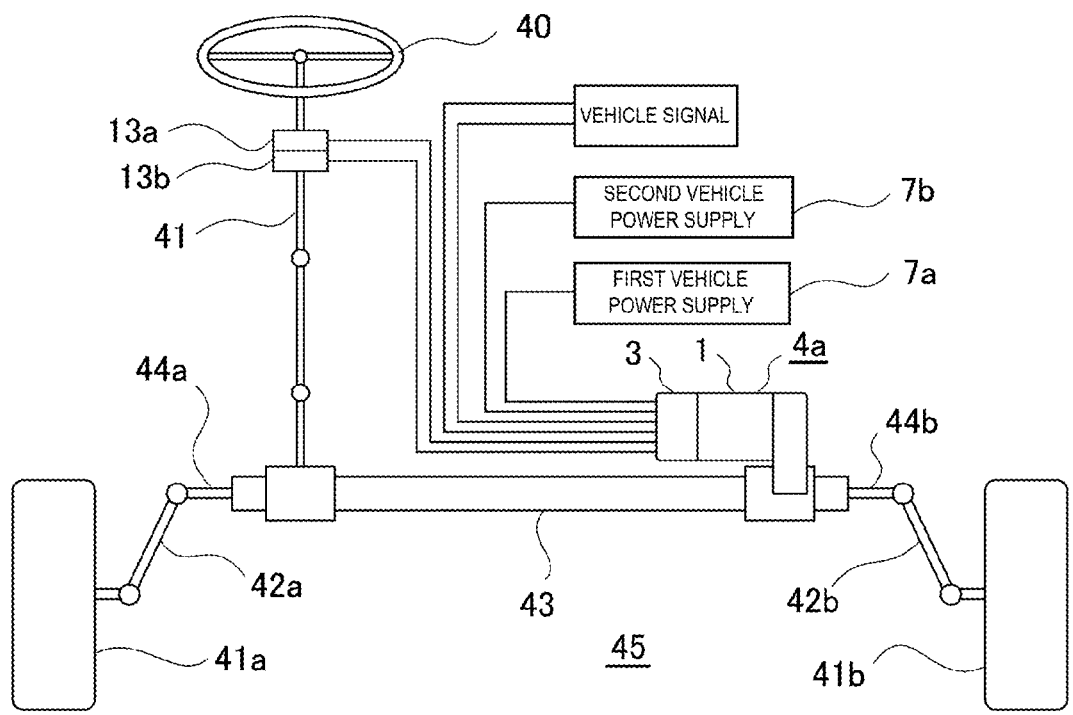
FIG. 4 is a configuration drawing of an electric power steering device wherein the drive device-integrated rotary electric machine according to the first embodiment of the invention is mounted in a vehicle.

Next, a description will be given of an electric power steering device of a vehicle in which the drive device-integrated rotary electric machine 4a according to the embodiment is mounted. FIG. 4 is a configuration drawing of an electric power steering device wherein the drive device-integrated rotary electric machine according to the first embodiment is mounted in a vehicle.

In FIG. 4, a steering shaft 41 is coupled to a steering wheel 40 operated by a driver. The first steering sensor 13a and the second steering sensor 13b, which detect a steering angle or a steering torque of the driver, are attached to the steering shaft 41. Tie rods 44a and 44b coupled to a rack shaft 43 are connected to knuckle arms 42a and 42b of front wheels 41a and 41b, which are steered wheels, and movement of the rack shaft 43 is transmitted to the front wheels 41a and 41b via the tie rods 44a and 44b and the knuckle arms 42a and 42b. Because of this, the front wheels 41a and 41b are steered. The drive device-integrated rotary electric machine 4a, which is a steering motor, is attached to the rack shaft 43, and an output of the drive device-integrated rotary electric machine 4a forms power that causes the rack shaft 43 to move. An electric power steering device 45 wherein steering in accordance with an operation by a driver is performed is formed by the drive device 3 appropriately controlling the rotary electric machine 1 based on input signals from the first steering sensor 13a and the second steering sensor 13b, and on a vehicle signal such as vehicle speed.

In the embodiment, the first power supply connector 5a, the second power supply connector 5b, the first signal connector 6a, and the second signal connector 6b are led out to the non-output shaft side from an axial direction end face of the drive device 3, but a lead-out direction of the connectors not being limited to this, the connectors may be led out in a radial direction. Also, a radial direction protruding portion may be provided on the drive device 3, and each connector may be led out to an output shaft side from the radial direction protruding portion. Furthermore, not being limited to a configuration wherein each connector is led out in the same direction, the connectors may be led out in different directions as appropriate in accordance with a layout of a vehicle.

The drive device-integrated rotary electric machine 4a configured in this way is such that the two sets of power supply voltages differ, and the size of the first power supply connector 5a on the high voltage side is reduced, because of which an external form of the device is small even though the connectors, the control circuits, the inverters, and the three-phase windings are duplicated, and ease of mounting in a vehicle, and ease of inserting and removing the connectors, are good. Also, manufacturing cost can be reduced. The drive device-integrated rotary electric machine 4a having these kinds of characteristic is such that high reliability and redundancy can be balanced with size reduction and weight reduction, because of which the drive device-integrated rotary electric machine 4a is particularly suitable as a device used in the vehicle electric power steering device 45.

Second Embodiment

Figure 5:
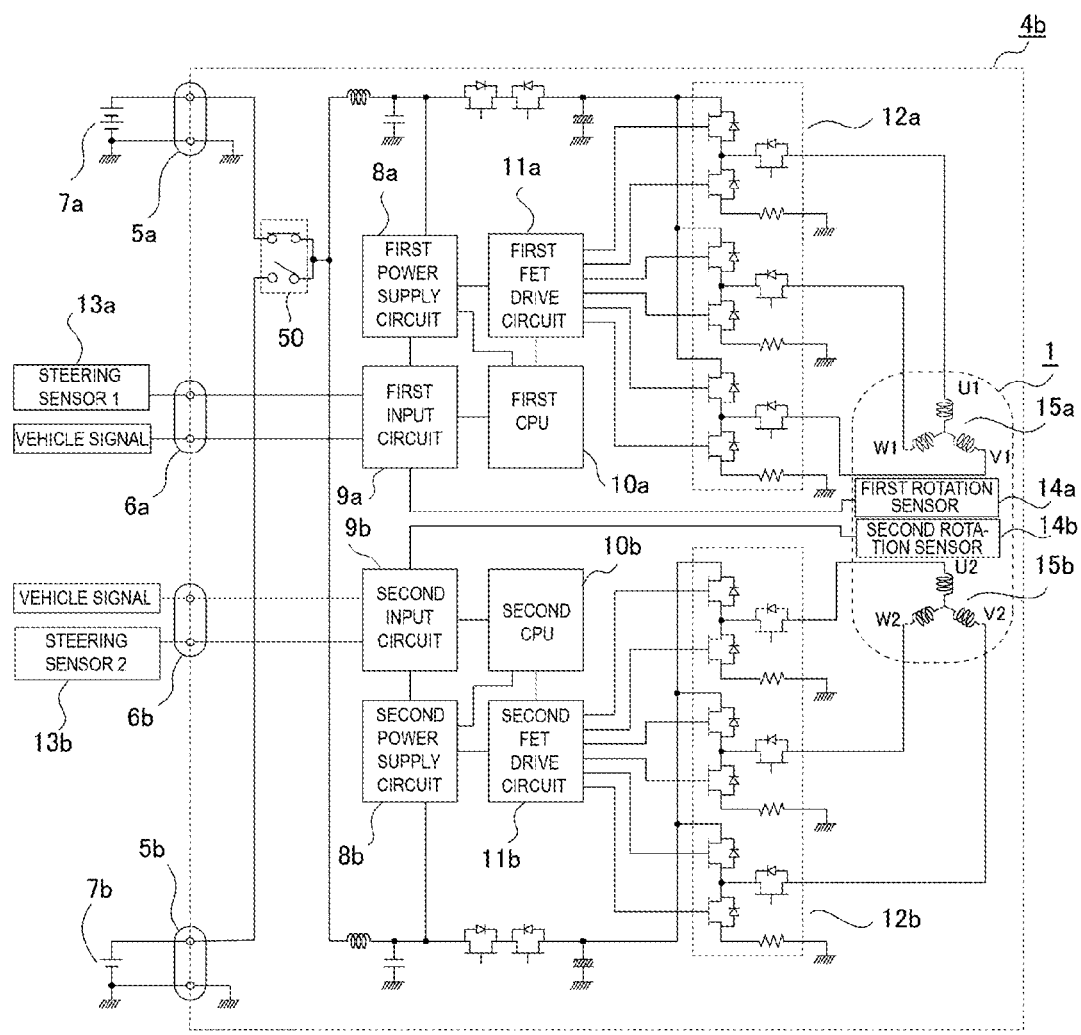
FIG. 5 is a circuit block diagram of a drive device-integrated rotary electric machine according to a second embodiment of the invention.

Next, a drive device-integrated rotary electric machine according to a second embodiment of the invention will be described. FIG. 5 is a circuit block diagram showing a drive device-integrated rotary electric machine 4b according to the second embodiment. In the second embodiment, a configuration has a power supply switching device 50, which is switching means that switches between the first vehicle power supply 7a input via the first power supply connector 5a and the second vehicle power supply 7b input via the second power supply connector 5b, and connects only either one thereof to the first power supply circuit 8a, the first inverter unit 12a, the second power supply circuit 8b, and the second inverter unit 12b. Other configurations are the same as in the first embodiment, and a redundant description is omitted by allotting the same reference signs.

The drive device-integrated rotary electric machine 4b according to the second embodiment is such that even when one vehicle power supply fails, power can be supplied normally to the two sets of control circuits, inverters, and three-phase windings of the device, because of which the device can generate the same output as at a normal time. In the embodiment, induced voltage constants of the first three-phase winding 15a and the second three-phase winding 15b are configured so as to be equal.

The drive device-integrated rotary electric machine 4b configured in this way is such that, in the same way as the drive device-integrated rotary electric machine 4a according to the first embodiment, the two sets of power supply voltages differ, and the size of the first power supply connector 5a on the high voltage side is reduced, because of which the external form of the device is small even though the connectors, the control circuits, the inverters, and the three-phase windings are duplicated, and ease of mounting in a vehicle, and ease of inserting and removing the connectors, are good. Furthermore, even when one of the first vehicle power supply 7a and the second vehicle power supply 7b fails, the device can be caused to operate normally, with no decrease in performance, by the power supply switching device 50 being switched to the vehicle power supply on the normal side. The drive device-integrated rotary electric machine 4b having this kind of characteristic is such that high reliability and redundancy can be balanced with size reduction and weight reduction, because of which, in the same way as the drive device-integrated rotary electric machine 4a according to the first embodiment, the drive device-integrated rotary electric machine 4b is particularly suitable for use in the vehicle electric power steering.

The embodiments can be freely combined, and each embodiment can be modified or abbreviated as appropriate, without departing from the scope of the invention.

REFERENCE SIGNS LIST 1 rotary electric machine, 2 coupling mechanism, 3 drive device, 4a, 4b drive device-integrated rotary electric machine, 5a first power supply connector, 5b second power supply connector, 6a first signal connector, 6b second signal connector, 7a first vehicle power supply, 7b second vehicle power supply, 8a first power supply circuit, 8b second power supply circuit, 9a first input circuit, 9b second input circuit, 10a first CPU, 10b second CPU, 11a first FET drive circuit, 11b second FET drive circuit, 12a first inverter unit, 12b second inverter unit, 13a first steering sensor, 13b second steering sensor, 14a first rotation sensor, 14b second rotation sensor, 15a first three-phase winding, 15b second three-phase winding, 40 steering wheel, 41 steering shaft, 41a, 41b front wheel, 42a, 42b knuckle arm, 43 rack shaft, 44a, 44b tie rod, 45 electric power steering device, 50 power supply switching device.

The invention claimed is:

1. A drive device-integrated rotary electric machine, comprising:
 a rotary electric machine having a first three-phase winding and a second three-phase winding;
 a first inverter unit that supplies a drive current to the first three-phase winding;
 a second inverter unit that supplies a drive current to the second three-phase winding;

a first power supply connector that connects the first inverter unit to a first vehicle power supply; and a second power supply connector that connects the second inverter unit to a second vehicle power supply, wherein said first power supply connector is smaller than said second power supply connector and has a lower current capacity, and wherein a voltage of the first vehicle power supply is higher than a voltage of the second vehicle power supply; and wherein a product of the voltage of the first vehicle power supply and the current capacity of the first power supply connector and a product of the voltage of the second vehicle power supply and the current capacity of the second power supply connector are equal, so that said first power supply connector delivers equivalent power to that of said second power supply connector, while obtaining a size reduction in said rotary electric machine.

2. The drive device-integrated rotary electric machine according to claim 1, wherein a modulation rate of the first inverter unit is smaller than a modulation rate of the second inverter unit.

3. The drive device-integrated rotary electric machine according to claim 1, wherein an induced voltage constant of the first three-phase winding is greater than an induced voltage constant of the second three-phase winding.

4. The drive device-integrated rotary electric machine according to claim 1, wherein the first power supply connector and the second power supply connector are each provided independently from the first inverter unit or the second inverter unit.

5. The drive device-integrated rotary electric machine according to claim 1, wherein the first power supply connector and the second power supply connector are provided in common to the first inverter unit and the second inverter unit, the rotary electric machine comprising switching means that can select either one of the first power supply connector and the second power supply connector, and connect the selected connector to the first inverter unit or the second inverter unit.

6. An electric power steering device, comprising:
a steering shaft coupled to a steering wheel operated by a driver;
a first steering sensor and a second steering sensor, attached to the steering shaft, that detect a steering angle or a steering torque of the driver;
a rack shaft coupled to the steering shaft; and
a drive device-integrated rotary electric machine attached to the rack shaft, wherein the drive device-integrated rotary electric machine is the drive device-integrated rotary electric machine according to claim 1.

* * * * *